United States Patent
Klein

(10) Patent No.: US 9,950,287 B2
(45) Date of Patent: Apr. 24, 2018

(54) FILTER FOR FLUID, FILTER ELEMENT OF A FILTER, AND FILTER HOUSING OF A FILTER

(71) Applicant: MANN+HUMMEL GMBH, Ludwigsburg (DE)

(72) Inventor: Martin Klein, Ludwigsburg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 863 days.

(21) Appl. No.: 14/290,049

(22) Filed: May 29, 2014

(65) Prior Publication Data

US 2014/0353236 A1 Dec. 4, 2014

(30) Foreign Application Priority Data

Jun. 3, 2013 (DE) .................. 10 2013 009 198

(51) Int. Cl.
| | |
|---|---|
| *B01D 35/06* | (2006.01) |
| *B01D 35/30* | (2006.01) |
| *B01D 35/00* | (2006.01) |
| *B01D 35/18* | (2006.01) |
| *B01D 36/00* | (2006.01) |
| *F02M 37/22* | (2006.01) |

(52) U.S. Cl.
CPC ......... *B01D 35/306* (2013.01); *B01D 35/005* (2013.01); *B01D 35/18* (2013.01); *B01D 36/005* (2013.01); *B01D 2201/291* (2013.01); *B01D 2201/4007* (2013.01); *F02M 37/22* (2013.01)

(58) Field of Classification Search
CPC ..................................... F02M 37/22
See application file for complete search history.

(56) References Cited

U.S. PATENT DOCUMENTS

| | | | |
|---|---|---|---|
| 2010/0276352 A1 | 11/2010 | Mendel et al. | |
| 2011/0089091 A1* | 4/2011 | Grass | B01D 35/153 210/90 |
| 2011/0303543 A1* | 12/2011 | Fritze | B01D 35/06 204/554 |

FOREIGN PATENT DOCUMENTS

| | | |
|---|---|---|
| DE | 3624276 A1 * | 1/1988 |
| DE | 202007010602 U1 | 12/2008 |

* cited by examiner

Primary Examiner — Thomas M Lithgow
(74) Attorney, Agent, or Firm — James Hasselbeck

(57) ABSTRACT

A filter for fluid has a filter housing and a filter element disposed in the filter housing. An element-associated electrical connecting element associated with an electrical/electronic functional component is provided. A housing-associated electrical connecting element is provided. When the filter element is mounted in the filter housing, the element-associated electrical element and the housing-associated electrical connecting element are connected electrically with each other and form an electrical connection. A positioning assist device assists in positioning the element-associated electrical connecting element and the housing-associated electrical connecting element relative to each other.

13 Claims, 3 Drawing Sheets

FILTER FOR FLUID, FILTER ELEMENT OF A FILTER, AND FILTER HOUSING OF A FILTER

CROSS-REFERENCE TO RELATED APPLICATION

This application claims the benefit of German patent application No. 10 2013 009 198.5 filed Jun. 3, 2013, the entire contents of the aforesaid German patent application being incorporated herein by reference.

BACKGROUND OF THE INVENTION

The invention concerns a filter for fluid, in particular fuel, oil, water, urea solution or air, in particular of an internal combustion engine, in particular of a motor vehicle, comprising a filter housing and comprising an element-associated and a housing associated electrical connecting element, wherein the element-associated and the housing-associated connecting elements are connected to each other when the filter element is mounted in the filter housing.

Moreover, the invention concerns a filter element of a filter for fluid, in particular fuel, oil, water, urea solution or air, in particular of an internal combustion engine, in particular of a motor vehicle, that can be exchangeably arranged in an openable filter housing by means of an installation movement at least in an axial direction relative to a mounting axis coaxially to the latter such that it seal-tightly separates an inlet of the filter housing for the fluid to be purified from an outlet for purified fluid and that comprises at a connecting end face at least one element-associated electrical connecting element of at least one electrical/electronic functional component.

Moreover, the invention concerns a filter housing of a filter for fluid, in particular fuel, oil, water, urea solution or air, in particular of an internal combustion engine, in particular of a motor vehicle, that can be opened and in which a filter element can be exchangeably arranged by means of an installation movement at least in axial direction relative to a mounting axis coaxially to the latter such that it seal-tightly separates an inlet of the filter housing for the fluid to be purified from an outlet for purified fluid.

DE 20 2007 010 602 U1 discloses a fuel filter of a motor vehicle for diesel fuel. The fuel filter comprises a filter housing, closed off by a detachable cover part. The cover part is provided with an inlet and with a discharge for the fuel. In the filter housing, an exchangeable filter element is secured which in predetermined servicing intervals after detachment of the cover part can be removed and replaced with a new filter element. A substantially tubular heating element for heating the fuel is arranged in the functional filter chamber at the raw side at radial spacing to the circumferential wall of the filter housing. The heating element is connected fixedly and non-detachably with the filter body for which purpose it is attached to the end disk by gluing, embedded by foaming, injection molding or the like. The heating element comprises an electrical heating wire. Two ends of the heating wire are bent radially inwardly for electrical contacting. A housing which is injection-molded of plastic material forms together with plug pins an electrical connecting plug.

The invention has the object to design a filter, a filter element, and a filter housing of the aforementioned kind with which an installation of the filter element into the filter housing, in particular positioning of the filter element in a correct mounted position, can be simplified. Moreover, an electrical connection of the element-associated electrical connecting element with the housing-associated electrical lines is to be realized in a simple way.

SUMMARY OF THE INVENTION

This object is solved according to the invention in that a positioning assist device is provided by means of which the element-associated connecting element, upon installation of the filter element in the filter housing, can be guided into a defined connecting position relative to the housing-associated connecting element.

According to the invention, a guide ramp with the ramp surface is arranged in the filter housing. Upon insertion of the filter element into the filter housing in axial direction to the filter axis with the connecting end face leading, the at least one element-associated connecting element and/or another section of the connecting end face hits the ramp surface. By rotation of the filter element in the filter housing about the filter axis in a rotational direction that corresponds to the screw-like course of the ramp surface and simultaneous movement of the filter element in axial direction toward the connecting end face of the filter housing, the filter element is guided along the ramp surface. At the end of the ramp surface, the at least one housing-associated electrical connecting element is arranged. The at least one element-associated connecting element then connects electrically with the at least one housing-associated connecting element. In this way, the filter element can be positioned in a simple way in the correct mounted position in the filter housing. Advantageously, in this context no attention must be paid to the orientation of the filter element relative to the filter axis upon installation. Also, a filter element that is rotatable relative to the filter axis can be simply positioned in the filter housing. The precision of the radial and the axial positioning action can be improved thereby. Also, by means of the ramp surface the at least one element-associated connecting element can be connected in a simple way with the at least one housing-associated connecting element. Contacting of the electrical connection can be realized advantageously substantially automatically by the rotation/insertion movement of the filter element. In this way, the at least one housing-associated connecting element can be arranged also at a location in the filter housing which upon installation of the filter element is not accessible and/or visible, or only with difficulty.

Advantageously, the filter housing can have a filter cup with a mounting opening that is coaxial to the filter axis of the filter housing. The mounting opening can be closed off by a filter cover in a detachable way. Advantageously, by means of a screw thread on its radial inner circumferential side or its radial outer circumferential side, the filter cover can be screwed on or into a matching screw thread on the radial outer circumferential side or the radial inner circumferential side of the filter cup. Advantageously, the screw-type course of the ramp surface can corresponds to the course of the screw thread of the filter cup and of the filter cover at least with respect to the direction of rotation. Advantageously, a pitch of the ramp surface can correspond to the pitch of the screw thread of the filter cup and of the filter cover. Advantageously, the filter cover can be designed such that it is suitable to entrain the filter element upon rotation and to thereby rotate it about the filter axis and to move it axially relative to the filter axis so that it can be moved into its correct mounted position by means of the ramp surface.

Advantageously, the filter element can comprises a filter medium designed as a hollow filter medium body that at least relative to the filter axis is closed circumferentially. Advantageously, the hollow filter medium body, preferably the entire filter element, can be rotatable relative to the filter axis. The hollow filter medium body can have approximately the shape of a hollow cylinder. The hollow filter medium body can also taper conically in axial direction. The hollow filter medium body can have a round, oval, square or differently designed cross-section. Advantageously, the filter element can be a round filter element or a conical-oval round filter element. In case of a round filter element, the hollow filter medium body can be a round hollow cylinder. The filter medium can be advantageously folded in a star shape and circumferentially closed. Due to the star-shaped folding, a high packing density can be achieved. In this way, a ratio of the surface area active for filtration to a required mounting space can be improved. Instead of a star-shaped folded shape, the filter medium can also have corrugated course in circumferential direction. The filter medium can also be non-folded and circumferentially closed. Advantageously, the hollow filter medium body can be configured to be flowed through from the exterior to the interior in radial direction by the fluid. The hollow filter medium body can also be flowed through in radial direction from the interior to the exterior.

Advantageously, the filter element can have at the connecting end face an end member, in particular an end disk. Advantageously, the at least one element-associated connecting element can be attached to the end member. The at least one element-associated connecting element can also be attached, additionally or alternatively, to a different part of the filter element, in particular to an electrical functional component, in particular a heating device. The end member can be advantageously seal-tightly connected to an end face of the hollow filter medium body. The end member can be advantageously provided with a central opening that is in particular coaxial to the filter axis and can serve as a passage for fluid and/or as a positioning aid for the filter element in the filter housing.

In an advantageous embodiment, by means of the positioning assist device, the element-associated connecting element upon installation of the filter element in the filter housing can be guided at least into a defined connecting rotational position about a mounting axis of the filter element and relative to the housing-associated connecting element.

In a further advantageous embodiment, for installation in the filter housing the filter element is to be guided substantially along a mounting axis into at least one part of the filter housing, which axis is substantially corresponding to the longitudinal filter element axis.

In a further advantageous embodiment, the positioning assist device can comprise a housing associated ramp along which an element-associated guide element upon installation of the filter element can glide in order to guide the element-associated connecting element into the defined connecting position relative to the housing-associated connecting element.

In a further advantageous embodiment, the housing-associated connecting element can be arranged on or in a housing bottom of the filter housing which is facing the connecting end face of the filter element. According to the invention, it is of no consequence where the housing bottom is spatially located in the operating position of the filter. In the operating position, the housing bottom can also be spatially on top or laterally arranged.

In a further advantageous embodiment, on the housing bottom a ramp surface facing the filter element can be arranged which can have a course that is coaxially coil-shaped relative to the filter axis, wherein the at least one housing-associated connecting element can be arranged on or behind, viewed in the circumferential direction, one of its ends where the ramp surface has the smallest spacing to a center plane of the housing bottom.

In a further advantageous embodiment, on the housing bottom a positioning support sleeve that is coaxial to the mounting axis can be arranged which can interact with an appropriate coaxial positioning opening in or on the connecting end face of the filter element. In this way, the radial positioning action of the filter element in the filter housing can be improved. The positioning support sleeve and the positioning opening can guide the filter element coaxially to the mounting axis upon installation in the filter housing upon axial movement and rotational movement. In this way, the guiding action of the connecting end face of the filter element, in particular of the at least one element-associated electrical connecting element, along the ramp surface can be improved also. Accordingly, installation of the filter element in the filter housing can be simplified as a whole. In this way, on the exterior the connection of the element-associated electrical connecting element with the at least one housing-associated electrical connecting element can be simplified. Advantageously, the positioning support sleeve can conically taper toward its free end. In this way, the positioning support sleeve can be inserted more easily into the positioning opening. The positioning support sleeve and the positioning opening can be advantageously provided with a round cross-section so that a rotation of the filter element on the positioning support sleeve is more uniform.

In a further advantageous embodiment, the positioning support sleeve can form at least partially the outlet for purified fluid and the positioning opening can form an outlet opening in the connecting end face of the filter element which can be connected with an interior of the filter element. In this way, an additional outlet opening in the connecting end face of the filter element is not required. By means of the positioning support sleeve the outlet opening can be connected simply and precisely with the housing-associated outlet in this way. An additional working step is not required for this.

In a further advantageous embodiment, the at least one element-associated connecting element and the at least one housing-associated connecting element can be inserted into each other for realizing the electrical connection wherein an insertion direction can extend axially to the mounting axis. In this way, the electrical connection, inasmuch as a rotational movement for positioning the filter element is required, can be realized simply by means of an axial movement of the filter element in the direction of the filter axis as soon as the at least one element-associated connecting element has reached the corresponding low end of the ramp surface. This axial movement can be effected when using a screw connection between filter cover and filter cup by means of the filter cover simply by further screwing on the filter cover in the closing direction. In this way, the electrical connection can be substantially automatically closed upon screwing on the filter cover.

In a further advantageous embodiment, the at least one element-associated connecting element and the at least one housing-associated connecting element can be designed as a plug/socket connection which can be connected by means of an insertion movement in the direction of the filter axis. In this way, a safe and robust electrical connection can be realized. Moreover, a fluid-tight connection can be realized also in this way.

Advantageously, the at least one element-associated connecting element can have a connecting housing which has at least one opening at its side that is axially facing away from the connecting end face of the filter element or the at least one housing-associated connecting element can have a housing-associated connecting housing which has at least one opening on its side that is axially facing away from the housing bottom, and the at least one element-associated connecting housing can be plugged onto the at least one housing-associated connecting housing, or vice versa. The connecting housing that is designed as a plug can advantageously have appropriate openings for electrical contact areas, in particular contact pins or contact bushings or flat plugs.

Advantageously, each connecting housing can have electrical contact areas arranged therein which, in the correct mounted position of the filter element, can be in electrical contact with appropriate electrical contact areas in the respective other connecting housing. Advantageously, the contact areas can be realized in the form of contact pins and/or contact bushings and/or flat plug contacts which, for electrical contacting, can be inserted into each other or placed against each other or can be brought into electrical contact in other ways. Advantageously, the electrical contact areas arranged in the connecting housings can be in particular protected from the fluid.

In a further advantageous embodiment, the at least one electrical/electronic functional component can comprise an electrical heating device for heating the fluid. The fluid in the filter housing can be heated with the heating device. In this way, its flowability can be improved. Advantageously, the heating device can be arranged in the flow direction of the fluid upstream of the filter medium so that the fluid is heated before it reaches the filter medium. In this way, a pressure loss between an inflow side, i.e., a raw side, of the filter medium and an outflow side, i.e., a clean side, can be reduced. Advantageously, the filter element can be pre-manufactured together with the heating device as a modular component. In this way, the filter element can be mounted in the filter housing and removed from it together with the heating device. Instead of the heating device, also a different kind of electrical/electronic functional component, in particular a filling level sensor, a temperature sensor and/or a water sensor, can be provided. It is also possible to provide several, even different, electrical/electronic functional components.

Advantageously, the heating device can comprise an electrically operated heating cage or heating jacket. The heating cage or heating jacket can enclose advantageously at least partially circumferentially the filter axis and at least partially in axial direction. Advantageously, the heating cage or the heating jacket can be permeable for the fluid in radial direction. Accordingly, the fluid can flow through the heating cage or the heating jacket in radial direction from the exterior to the interior, or in reverse.

According to the invention, the technical object is further solved for the filter element in that the at least one element-associated connecting element is designed such that, in the correct mounted position of the filter element in the filter housing, it can realize an electrical connection with at least one housing-associated electrical contact element that is arranged on or in a housing bottom of the filter housing which is facing the connecting end face of the filter element, and such that the connecting end face and/or the element-associated connecting element can be guided along a facing ramp surface, which is arranged on the housing bottom and which has, relative to the mounting axis, a coaxial screw-like course for connecting with the housing-associated connecting element. All advantages and features of the filter according to the invention apply to the filter element according to the invention likewise, and vice versa.

According to the invention, the technical object is furthermore solved for the filter housing in that on or in a housing bottom of the filter housing that is facing the connecting end faces of the filter element at least one housing-associated electrical connecting element is arranged which, in the correct mounted position of the filter element in the filter housing, can realize an electrical connection with at least one element-associated connecting element, arranged at the connecting end face of the filter element, of at least one electrical/electronic functional component, and on the housing bottom a ramp surface is arranged which is facing the filter element and has a course that is coaxial and screw-like relative to the mounting axis, and on or behind, viewed in the circumferential direction, one of its ends, where the ramp surface has the smallest spacing to a central plane of the housing bottom, the at least one housing-associated connecting element is arranged. All advantages and features of the filter according to the invention and of the filter element according to the invention apply likewise to the filter housing according to the invention, and vice versa.

BRIEF DESCRIPTION OF THE DRAWINGS

Further advantages, features and details of the invention result from the following description in which an embodiment of the invention will be explained in more detail with the aid of the drawing. A person of skill in the art will expediently consider the features disclosed in the drawing, the description, and the claims in combination also individually and combine them to meaningful further combinations.

In the Figures same components are identified with same reference numbers.

DESCRIPTION OF PREFERRED EMBODIMENTS

Figure 1:
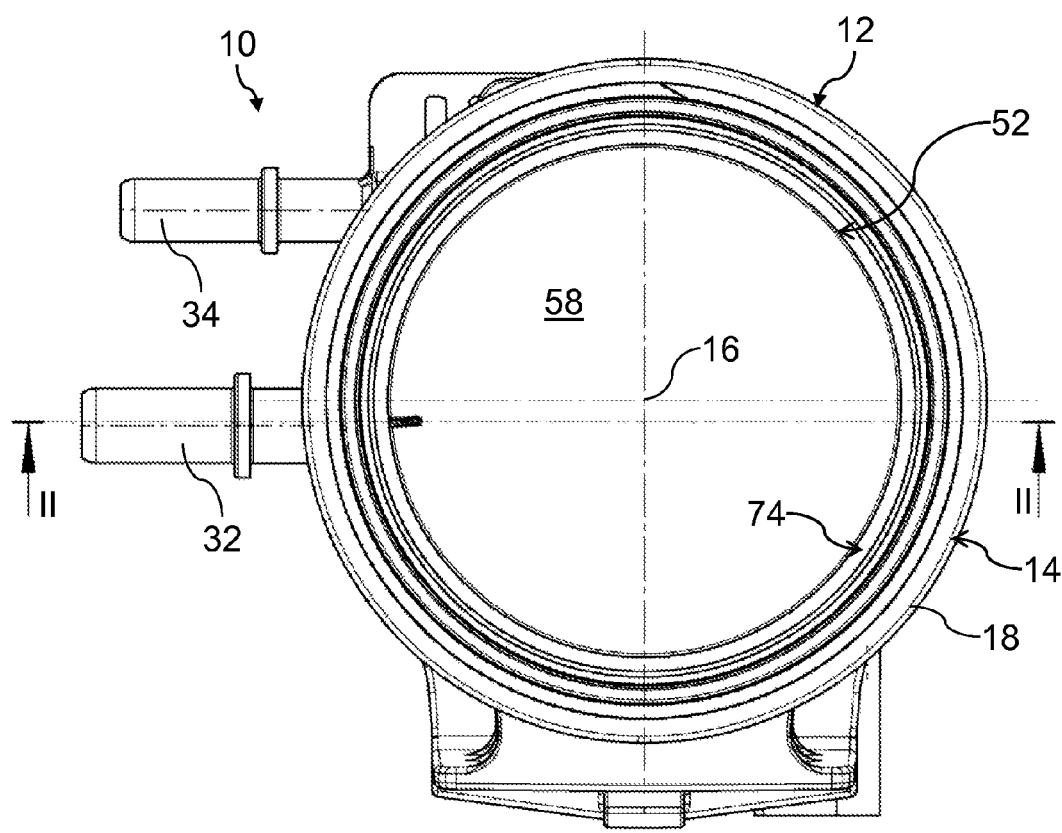
FIG. 1 shows a plan view onto a fuel filter with an open filter housing in which an exchangeable round filter element with a heating jacket is arranged.
Figure 2:
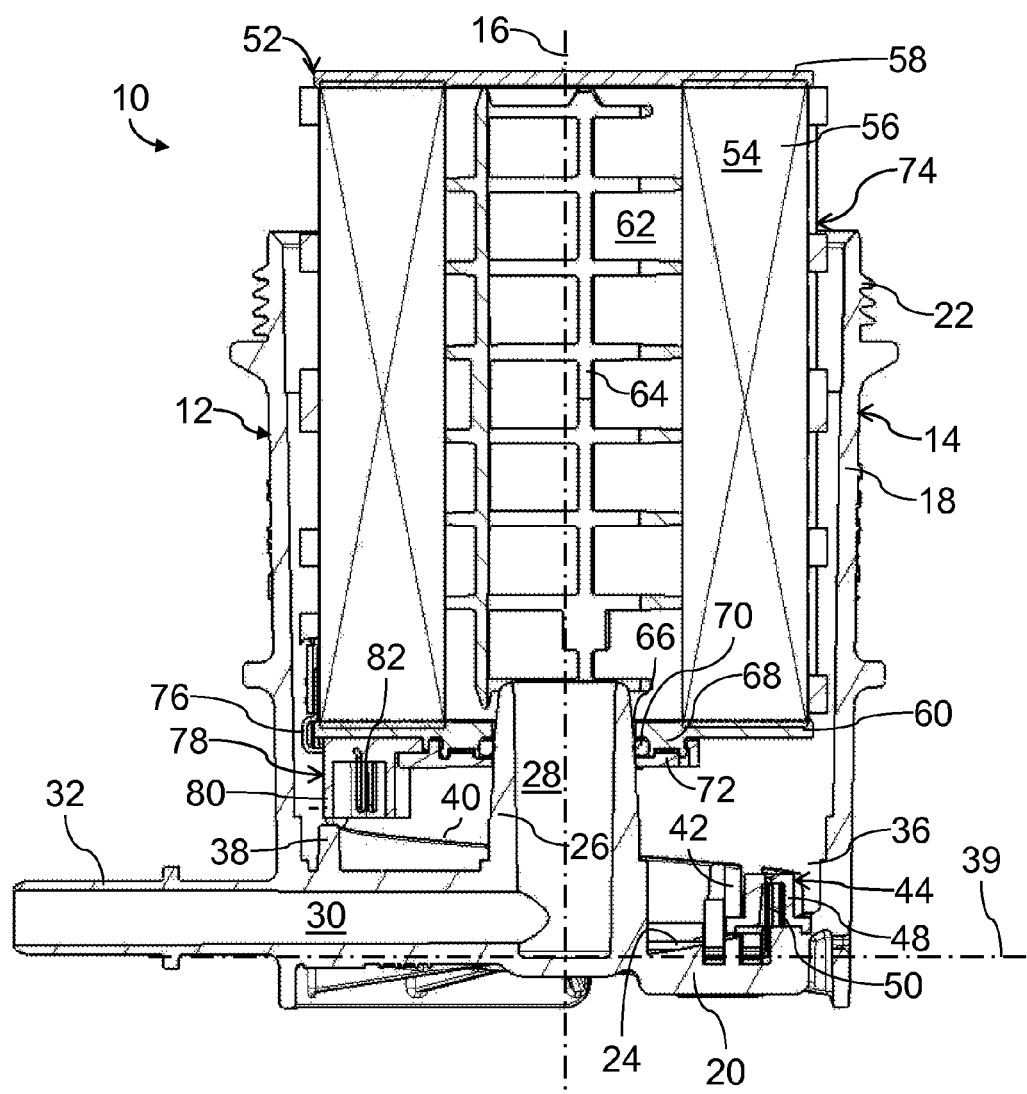
FIG. 2 is a section view of the fuel filter of FIG. 1 along section line II-II indicated in FIG. 1, wherein the round filter element is in a position in an early phase of installation in the filter housing.
Figure 3:
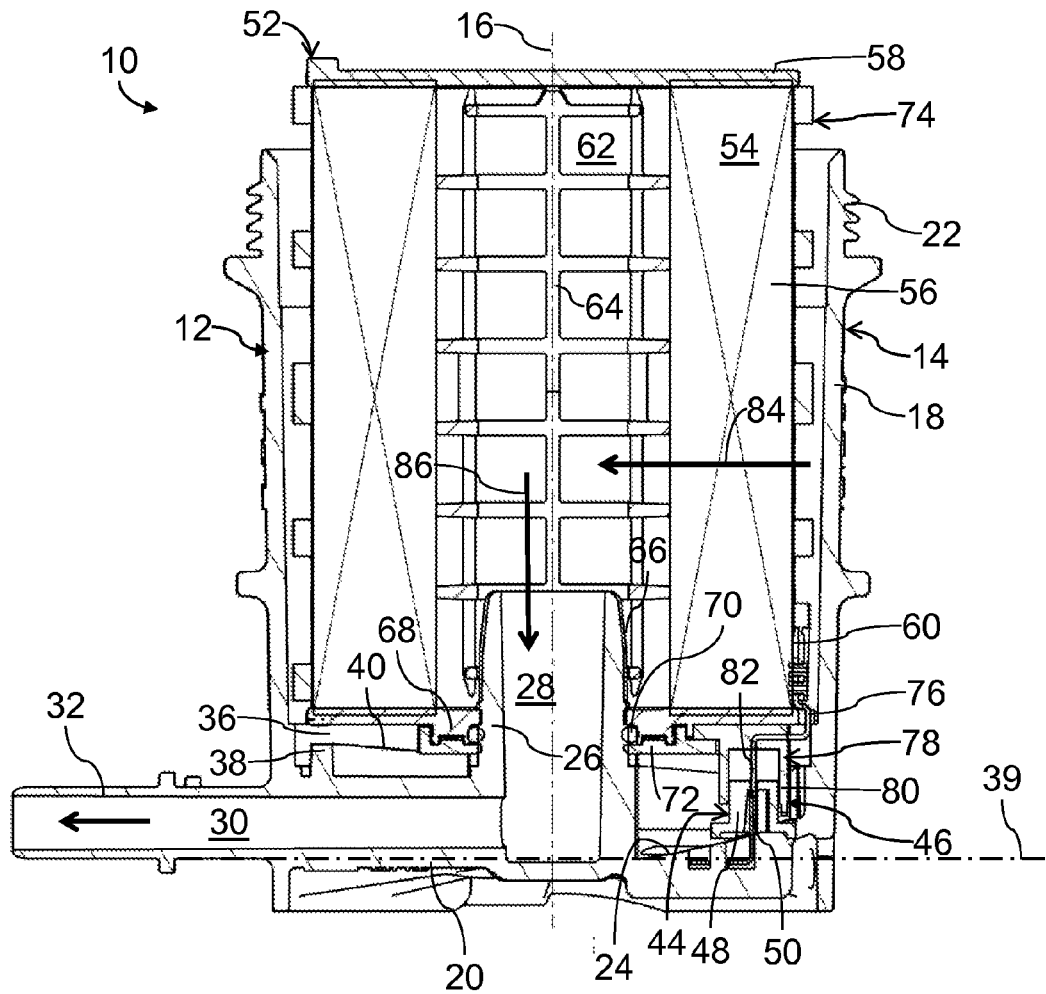
FIG. 3 is a section view of the fuel filter as in FIG. 2, wherein the round filter element is shown in its correct mounted position in the filter housing.

In the FIGS. 1 to 3, a fuel filter 10 of an internal combustion engine of a motor vehicle is shown. In FIG. 1, the fuel filter 10 is shown in a plan view. FIGS. 2 and 3 show the fuel filter in longitudinal section in different mounting phases.

The fuel filter 10 comprises a filter housing 12 which is combined of a filter cup 14 and a filter cover, not shown in the Figures, so as to be separable. According to the invention, it is of no consequence where the filter cup 14 is spatially positioned relative to the filter cover in the mounted state of the fuel filter 10. For example, the filter cup 14 can also be spatially at the top and the filter cover at the bottom. The filter cup 14 comprises a circumferential wall 18 that is coaxial to an imaginary filter axis 16. When in the present description, "radial", "axial", "circumferential" or the like is mentioned, this refers to the filter axis 16, if nothing differently is mentioned. The circumferential wall 18 passes monolithically at the lower end face in FIGS. 2 and 3 into a housing bottom 20. At the opposite end face, in FIGS. 2 and 3 at the top, the circumferential wall 18 is open. Here, the circumferential wall 18 has at its radial outer circumferential side an outer thread 22 onto which the filter cover with an appropriate inner thread can be screwed for closing off the filter housing 12.

On the inner bottom side 24 of the housing bottom 20 that is facing the interior of the filter housing 12, there is a hollow positioning support sleeve 26 monolithically connected and arranged coaxial to the filter axis 16. A radial outer circumferential side of the positioning support sleeve 26 has a round cross-section. The positioning support sleeve 26 conically tapers toward its free end. An interior 28 of the positioning support sleeve 26 is open at the end face which is facing away from the inner bottom side 24.

An outlet passage 30 for the purified fuel is connected in the vicinity of the housing bottom 20 with the interior 28 of the positioning support sleeve 26. The outlet passage 30 extends radially in outward direction out of the filter housing 12. The outlet passage 30 opens outside of the filter housing 12 into an outlet socket 32. The outlet socket 32 is connected with the fuel line, not illustrated, for discharging the filtered fuel.

The inlet socket 34, which is shown in FIG. 1, extends in the vicinity of the housing bottom 20 into the filter cup 14 and opens into an inlet space 36 at the housing bottom 20 of the filter cup 14. The inlet socket 34 is connected outside of the filter housing 12 with an inlet-associated fuel line.

The positioning support sleeve 26 is surrounded by a coaxial guide ramp 38 which is located in the vicinity of the circumferential wall 18. The guide ramp 36 is connected at an axial side monolithically with the housing bottom 20. The positioning support sleeve 26 projects with its free end past the guide ramp 38 in axial direction. An axial extension of the positioning support sleeve 26 from an imaginary center plane 39 of the housing bottom 20 to its free end is approximately twice as large as the axial height of the highest location of the guide ramp 36 relative to the center plane 39. The highest location of the guide ramp 38 is not shown in FIGS. 2 and 3 as a result of the extension of the section plane. The center plane 39 extends perpendicular to the filter axis 16. A ramp surface 40 on the exposed side of the guide ramp 38 which is facing away from the inner bottom side 24 has a screw-shaped course. A pitch orientation of the screw-shaped course of the ramp surface 40 corresponds to a pitch orientation of the outer thread 22. In FIGS. 2 and 3, for improved illustration, the pitch of the ramp surface 40 is illustrated over-proportionally. Preferably, the pitch of the ramp surface 40 corresponds to a pitch of the outer thread 22 and of the corresponding inner thread of the filter cover.

On the side opposite the outlet passage 30 in radial direction, the guide ramp 38 and the ramp surface 40 have an interrupted section 42. In the interrupted section 42 a connecting plug 44 of an electrical plug connection 46 is arranged which is shown in FIG. 3 in the connected state. The connecting plug 44 is thus located adjacent to the end of the ramp surface 40 where a spacing between the ramp surface 40 and the center plane 39 is smallest. At this end, the ramp surface 40 has its lowermost point. Here, the guide ramp 38 is lowest, i.e., has the smallest axial height relative to the center plane 39. At the side of the interrupted section 42 that is circumferentially approximately opposite the lowermost point of the ramp surface 40, there is the already mentioned but not illustrated highest point of the ramp surface 40.

The connecting plug 44 comprises a plug housing 48 which is attached with one side the inner bottom side 24 of the housing bottom 20. The plug housing 48 has on its side which is facing away from the inner bottom side 24 two openings for one of two contact sleeves 50, respectively. The two contact sleeves 50 are arranged in the plug housing 48 and extend approximately in axial direction. The contact sleeves 50, on the side which is facing the inner bottom side 24, each are connected with an electrical line which is extending away from the filter housing 12 and, outside of the fuel filter 10, is connected with appropriate electrical supply lines of a current source or a control unit, for example, a motor control unit.

In the filter housing 12, an exchangeable round filter element 52 is arranged coaxial to the filter axis 16. In the mounted state, a longitudinal axis of the filter element is identical with the filter axis 16. FIG. 2 shows the round filter element 52 in a position of a mounting phase during installation before reaching the correct mounted position. FIG. 3 shows the round filter element 52 in the correct mounted position. The round filter element 52, as a whole, has the shape of a hollow circular cylinder. The round filter element 52 comprises a circumferentially closed filter medium 56 that is folded star-shaped to a filter bellows 54. On its end face facing away from the housing bottom 20, the filter bellows 54 is connected seal-tightly with a counter end disk 58. On the other end face, the filter bellows 54 is seal-tightly connected with an annular connecting end disk 60.

In an interior 62 of the filter bellows 54, a frame-like central support tube 64 is coaxially arranged, wherein the radial inner circumferential sides, i.e., the radial inner fold edges, of the filter bellows 54 can be supported on its radial outer circumferential sides. The central support tube 64 extends axially between the counter end disk 58 and the connecting end disk 60.

The connecting end disk 60 has a coaxial through opening 66 which serves also as a positioning opening for the positioning support sleeve 26. On the axial exterior side of the connecting end disk 60 which is facing away from the interior 60, the outlet opening 66 is surrounded by a coaxial sealing rim 68. An annular seal 70 is resting on the radial inner circumferential side of the sealing rim 68. With the annular seal 70, the outlet opening 66 is sealed relative to the radial outer circumferential side of the positioning support sleeve 26. On the free end face of the sealing rim 68 which is facing away from the interior 62, a fixation ring 72 is arranged in axial direction with which the annular seal 70 is secured in its axial position.

The filter bellows 54 is surrounded by an electrical heating cage 74 that is closed in circumferential direction coaxially to the filter axis 16. The heating cage 74 extends in axial direction between the counter end disk 58 and the connecting end disk 60. The radial inner circumferential side of the heating cage 74 is positioned on the radial outer circumferential side, i.e., on the radial outer folding edges, of the filter bellows 54. The heating cage 74 can be flowed through in radial direction from the exterior to the interior by the fuel to be purified so that the fuel is heated before it reaches a raw side, i.e., an inflow side, of the filter medium 56.

Two electrical connecting tabs 76 of the heating cage 74 extend at the side which is facing the connecting end disk 60 to an electrical connecting socket 78 of the electrical plug connection 46. The connecting socket 78 is located on the exterior side of the connecting end disk 60 that is facing away from the filter bellows 54. The connecting socket 78 comprises a socket housing 80 in which two electrical contact pins 82 are embedded by potting. The contact pins 82 are electrically connected to the connecting tabs 76. The socket housing 80 is eccentrically secured by means of a snap-on connection, not of interest in this context, in the vicinity of the radial outer rim of the connecting end disk 60. The socket housing 80 is open at the side which is facing away from the connecting end disk 60. The contact pins 82 extend in axial direction in the interior of the socket housing 80. A radial outer rim of the socket housing 80 is located at the same radial spacing relative to the filter axis 16 as the ramp surface 40.

The round filter element 52 is pre-assembled with the heating cage 74 and the connecting socket 78 as a modular unit.

For installation in the filter housing 12, the pre-assembled round filter element 52, with the connecting end disk 60 leading, is inserted into the open filter 14 in axial direction relative to the filter axis 16 which in this case corresponds to a mounting axis. In this context, first the positioning support sleeve 26 projects into the outlet opening 66 and effects a pre-centering action of the round filter element 52 in the filter cup 14. During the following axial movement and rotational movement, the round filter element 52 is guided on the positioning support sleeve 26.

Should randomly the circumferential position of the connecting socket 78 coincide with the circumferential position of the connecting plug 44, the plug housing 48 with a further axial movement of the round filter element 52 can be inserted into the socket housing 80 and the electrical plug connection 46 is closed, as shown in FIG. 3. Subsequently, the filter cover is screwed onto the filter cup 14 and the filter housing 12 is closed in this way. The further axial movement of the round filter element 52 by means of which the electrical plug connection 46 is closed, can also be effected by screwing on the filter cover.

In case the circumferential position of the connecting socket 78 is not coinciding with the circumferential position of the connecting plug 44, the radial outer side of the socket housing 80 impacts with its free rim on the ramp surface 40 and prevents in this way a further purely axial movement. Upon impact of the socket housing 80 on the ramp surface 40, the round filter element 52 is already guided by the positioning support sleeve 26. In this mounting phase, the filter cover is placed onto the filter cup 14 and screwed in closing direction. In doing so, the filter cover entrains the round filter element 52 so that the latter is rotated about the filter axis 16. In doing so, the socket 80 is guided along the screw-type ramp surface 40. At the low end of the ramp surface 40, the connecting socket 78 is automatically inserted into the socket housing 80 due to the axial force transmitted upon further screw-on action of the filter cover and the electrical plug connection 46, as described above already, is closed.

Upon operation of the fuel filter 10, the fuel to be filtered flows through the inlet socket 34 into the inlet chamber 36. From here, the fuel flows to the radial outer circumferential side of the heating cage 74. The fuel flows first through the heating cage 74 and then through the filter bellows 54 from the exterior to the interior in radial direction, in FIG. 3 indicated by arrow 84. By means of the heating cage 74, the fuel is heated so that it becomes more flowable. As it passes through the filter medium 56, the fuel is purified. The purified and heated fuel reaches the interior 62 of the round filter element 52 and from there the interior 28 of the positioning support sleeve 26, as indicated by arrow 86. The fuel reaches passes from the interior 28 through the connecting passage 30 and the outlet socket 32 into the fuel line.

In the above-described embodiment of a fuel filter 10, of a round filter element 52, and of a filter housing 12, inter alia the following modifications are possible.

The invention is not limited to a fuel filter 10 of an internal combustion engine of a motor vehicle. Instead, it can also be used in other types of filters for fluids, in particular oil, water, air or urea solution. The invention can also be used outside of the automotive field, for example, in industrial motors. Moreover, the invention is not limited to internal combustion engines.

Instead of being connected by means of a snap-on connection, the connecting socket 78 can also be connected in a different way on the end face of the round filter element 52. The connecting socket 78 can be, for example, glued, fused or connected by means of another connection, including a mechanical one, to the exterior side of the connecting end disk 60. The connecting socket 78 can also be screwed onto the connecting end disk 60. The socket housing 80 can also be connected monolithically with the connecting end disk 60. Alternatively or in addition, the connecting socket 78 can also be attached by means of the connecting tabs 76 to the heating cage 74.

Instead of the heating cage 74, also a different type of heating device can be provided, for example, comprising a heating jacket that at least partially circumferentially and axially surrounds the filter bellows 54.

In addition or as an alternative to the heating cage 74, also another type of electrical/electronic functional component, for example, a temperature sensor, a filling level sensor and/or a water sensor, can be provided.

Alternatively, the round filter element 52 can first be inserted into the filter cover and then, together with the latter, can be screwed into the filter housing 12.

While specific embodiments of the invention have been shown and described in detail to illustrate the inventive principles, it will be understood that the invention may be embodied otherwise without departing from such principles.

What is claimed is:

1. A filter for fluid comprising:
   a filter housing comprising:
   an annular screw-shaped ramp formed on an interior of the housing, the screw-shaped ramp having a ramp surface with high end and low end, the ramp surface interrupted between the high and low ends; and
   a housing electrical connecting socket arranged on the filter housing and positioned at the low end of the ramp surface of the screw-shaped ramp;
   a filter element disposed in the filter housing, the filter element comprising:
   an annular end disk on an axial end of the filter element;
   a through opening extending through the annular end disk and opening into an interior of the filter element;
   an annular seal ring arranged at the through opening and surrounding the though opening, the annular seal ring configured to seal in a radially inward direction;
   a filter element connecting socket arranged on an axially outer surface of the annular end disk;
   a plurality of electrical contact pins arranged in an interior of the filter element connecting socket; and
   an electrical/electronic functional component and disposed on the filter element and connected to the electrical contact pins of the filter element connecting socket;

wherein, the filter element is rotated in the filter housing during installation and the ramp surface of the screw-shaped ramp is configured to contact and guide the filter element connecting socket on the screw-shaped ramp towards the housing electrical connecting socket at a defined rotational connecting position such that the plurality of electrical contact pins of the filter element contact electrical contacts of the housing electrical connecting socket completing an electrical connection;

wherein the annular screw-shaped ramp is configured as a positioning assist device to rotationally align the filter element in the filter housing to complete the electrical connection.

2. The filter according to claim 1, wherein, during installation of the filter element in the filter housing, the positioning assist device guides the filter element connecting socket on the screw-shaped ramp to engage the housing electrical connecting socket about a mounting axis of the filter.

3. The filter according to claim 1, wherein, for installation of the filter element in the filter housing, the filter element is inserted substantially along a mounting axis into at least one part of the filter housing, wherein the mounting axis substantially corresponds to a longitudinal axis of the filter element.

4. The filter according to claim 1, wherein the element-associated electrical connecting element and the housing-associated electrical connecting element are inserted into each other for forming the electrical connection, wherein an insertion direction extends axial to a mounting axis of the filter element.

5. The filter according to claim 1, wherein the annular screw-shaped ramp guides the filter element connecting socket on a coaxial screw-shaped course.

6. The filter according to claim 1, wherein the filter housing has a housing bottom and wherein the housing electrical connecting socket is arranged on the housing bottom on a side that is facing a connecting end face of the filter element.

7. The filter according to claim 6, wherein on the housing bottom the ramp surface is arranged that is facing the filter element and has a coaxial screw-shaped course relative to a filter axis of the filter housing, wherein the ramp surface has an end where the ramp surface has a smallest spacing relative to a center plane of the housing bottom, wherein at said end of the ramp surface or behind said end, viewed in a circumferential direction of the filter housing, the housing electrical connecting socket is arranged.

8. The filter according to claim 6, wherein the housing bottom comprises a hollow tubular positioning support sleeve which is coaxial to a mounting axis of the filter element, the hollow tubular positioning support sleeve received through the through opening of the filter element, the annular seal ring of the filter element sealing radially to an radially outer surface of the hollow tubular positioning support sleeve.

9. The filter according to claim 8, wherein the positioning support sleeve forms partially an outlet of the filter housing for purified fluid and the positioning opening forms an outlet opening in the connecting end face of the filter element, wherein the outlet opening is connected with an interior of the filter element.

10. The filter according to claim 1, wherein the electrical/electronic functional component is an electrical heating cage arranged directly on filter medium on a radial outer side of the filter element, the electrical heating cage arranged on and surrounding the filter medium.

11. A filter element of a filter for fluid according to claim 1, wherein the filter element is configured to be arranged in the filter housing of the filter by an insertion movement at least in an axial direction relative to a mounting axis coaxially to the mounting axis and is configured to separate seal-tightly an inlet of the filter housing for fluid to be purified from an outlet of the filter housing for purified fluid, the filter element comprising:

an annular end disk arranged on an axial end of the filter element;

a through opening extending through the annular end disk and opening into an interior of the filter element;

an annular seal ring arranged at the through opening and surrounding the though opening, the annular seal ring configured to seal in a radially inward direction;

a filter element connecting socket arranged on an axially outer surface of the annular end disk radially outwardly from the through opening;

a plurality of electrical contact pins arranged in an interior of the filter element connecting socket; and an electrical/electronic functional component and disposed on the filter element and connected to the electrical contact pins of the filter element connecting socket;

wherein the filter element connecting socket is configured such that, in a correct mounted position of the filter element in the filter housing, an electrical connection is formed with at least one housing-associated electrical connecting element arranged on a housing bottom of the filter housing facing the connecting end face.

12. The filter element according to claim 11, configured to be exchangeably arranged in the filter housing.

13. The filter element according to claim 11, wherein, for connecting with the housing-associated electrical connecting element, the filter element connecting socket is configured to be guided on a facing ramp surface arranged on the housing bottom and having a coaxial screw-shaped course relative to the mounting axis.

* * * * *